(12) United States Patent
Furukawa et al.

(10) Patent No.: US 7,224,821 B2
(45) Date of Patent: May 29, 2007

(54) PLATE IMAGE INSPECTION FOR PRINTING PREPRESS

(75) Inventors: Itaru Furukawa, Kyoto (JP); Setsuo Ohara, Kyoto (JP); Shinichi Maeda, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 631 days.

(21) Appl. No.: 10/694,004

(22) Filed: Oct. 28, 2003

(65) Prior Publication Data
US 2004/0086156 A1     May 6, 2004

(30) Foreign Application Priority Data
Oct. 29, 2002   (JP)   .............................. 2002-314261

(51) Int. Cl.
*G06K 9/00*   (2006.01)
(52) U.S. Cl. .................................... 382/112; 382/141
(58) Field of Classification Search ................ 382/112, 382/141, 114, 1.9, 318; 358/1.9, 1.7; 250/559; 348/86, 125
See application file for complete search history.

(56) References Cited

U.S. PATENT DOCUMENTS

| | | | | |
|---|---|---|---|---|
| 4,649,566 A | * | 3/1987 | Tsunoda et al. | 382/112 |
| 4,827,526 A | * | 5/1989 | Matsumoto | 382/112 |
| 5,764,793 A | * | 6/1998 | Omae et al. | 382/149 |
| 5,969,798 A | * | 10/1999 | Nakagawa et al. | 355/52 |
| 6,031,932 A | * | 2/2000 | Bronstein et al. | 382/141 |
| 6,700,679 B1 | * | 3/2004 | Fujita et al. | 358/1.9 |
| 7,020,350 B2 | * | 3/2006 | Sakai et al. | 382/294 |
| 7,127,100 B2 | * | 10/2006 | Wenzel et al. | 382/154 |
| 2002/0097419 A1 | * | 7/2002 | Chang et al. | 358/1.13 |

FOREIGN PATENT DOCUMENTS

| | | |
|---|---|---|
| JP | 7-219202 | 8/1995 |
| JP | 8-304994 | 11/1996 |
| JP | 9-6975 | 1/1997 |
| JP | 10-154234 | 6/1998 |
| JP | 2001-118067 | 4/2001 |

OTHER PUBLICATIONS

Japanese Office Action issued in corresponding Japanese Patent Application No. JP 2002-314261, dated Sep. 5, 2006.

* cited by examiner

*Primary Examiner*—Joseph Mancuso
*Assistant Examiner*—Andrae Allison
(74) *Attorney, Agent, or Firm*—McDermott Will & Emery LLP

(57) ABSTRACT

A prepress system comprises a raster image processor for developing first print image data to display resolution to create first raster image data, and for developing second print image data to the display resolution to create second raster image data. A plate image inspection processor executes a plate image inspection process by comparing the first and second raster image data, and displays on a display device the result of the plate image inspection process.

20 Claims, 11 Drawing Sheets

DEVELOPMENT REFERENCE POSITIONS

○ POSSIBLE REFERENCE POSITIONS

◎ DEFAULT REFERENCE POSITION

PLATE IMAGE INSPECTION FOR PRINTING PREPRESS

BACKGROUND OF THE INVENTION

1. Field of the Invention

The present invention relates to prepress technology for carrying out a prepress process using print data that represents a printed matter.

2. Description of the Related Art

In line with progress in computer technology, computer digitization has come into widespread use even in prepress systems for commercial printing. In a digital printing prepress system, print image data (for example, PDF data or PostScript data, PostScript being a trademark of Adobe Systems Incorporated) is received, various data processing is performed on this print image data, binary plate data is prepared, and either a plate or screen film is output using this plate data. More recently, on-demand printing, wherein binary print image data is prepared in the prepress system, and this binary print image data is transferred to an on-demand printer and printed directly, has also come into use. Herein, the overall process for preparing this kind of binary plate data and binary print image data is referred to as "printing prepress."

In printing prepress, it is important that an image for printing be proofed in accordance with client instructions. Thus, special care is taken in carrying out proofchecking of printed material, and in conducting plate image inspection to check whether proofchecking results have been accurately reflected. In a digital prepress system, plate image inspection is carried out by comparing plate data before and after proofchecking.

In prepress systems to date, in order to have the final printed product meet client requirements, plate image inspection is carried out using data that approximates the final printed product. For example, when preparing a plate, prepress process is done using data just prior to output of the plate, screen film, or the like. Such data has high resolution (4,000 dpi, for example), and contains an extremely large amount of information. Thus, in some instances, the process of comparing data before and after proofing to perform prepress was extremely time consuming.

SUMMARY OF THE INVENTION

Accordingly, an object of the present invention is to speed up plate image inspection in a prepress system.

In order to attain at least part of and other related object of the present invention, there is provided a prepress system for performing a prepress process using print data that represents a printed matter. The prepress system comprises a raster image processor for converting first print image data to first raster image data having a display resolution, and for converting second print image data to second raster image data having the display resolution; a data storage for storing the first raster image data created in advance prior to creation of the second raster image data; and a plate image inspection processor for executing a plate image inspection by comparing the first raster image data with the second raster image data, and displaying on a display device the result of the plate image inspection.

Since the plate image inspection is carried out using raster image data having a display resolution, the plate image inspection can be performed more quickly.

The present invention may be implemented in various embodiments, for example, a plate image inspection method and plate image inspection apparatus, a prepress method and prepress apparatus, a computer program for realizing the functions of such a method or apparatus, a storage medium having such a computer program recorded thereon, or a data signal including such a computer program, embodied in a carrier wave.

These and other objects, features, aspects, and advantages of the present invention will become more apparent from the following detailed description of the preferred embodiments with the accompanying drawings.

DESCRIPTION OF THE PREFERRED EMBODIMENT

The embodiments of the invention are described hereinbelow in the following order.
A. Overall Configuration of the System
B. Embodiments
C. Variant Examples

A. Overall Configuration of the System

Figure 1:
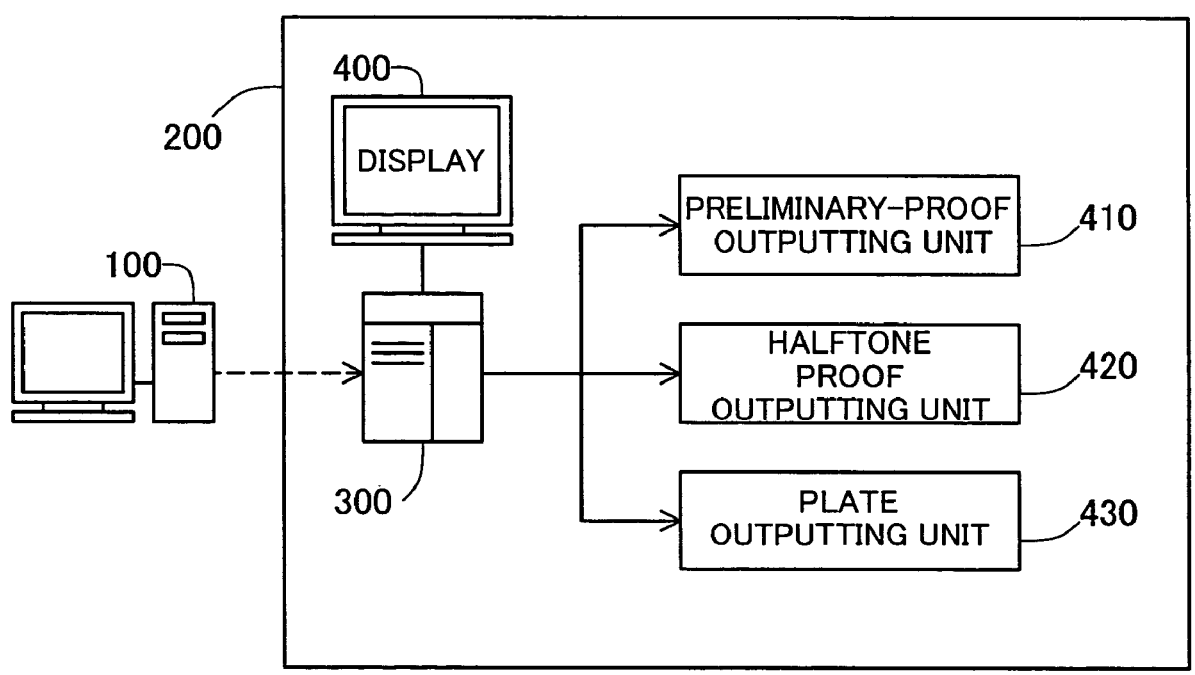
FIG. 1 is a schematic diagram showing the overall arrangement of a printing system.

FIG. 1 is a schematic diagram showing the overall configuration of a printing system in an embodiment of the invention. This printing system comprises a design device 100 for designing printed matter and preparing print image data; and a prepress system 200 for preparing a plate or a printed material based on this print image data. The prepress system 200 is constituted by networking a workflow control system 300 and three output units 410, 420, 430. That is, preliminary proof output unit 410 prints a preliminary proof in accordance with digital data obtained with print image data; halftone proof output unit 420 outputs a halftone proof of data produced by halftone processing (halftoning) of digital data; and plate output unit 430 prepares a plate directly from digital data. Plate output unit 430 is also referred to as a CTP (Computer-to-Plate) device. A display device 400, such as a CRT display or LCD display, is connected to the workflow control system 300, so that print images corresponding to print image data can be displayed.

Figure 2:
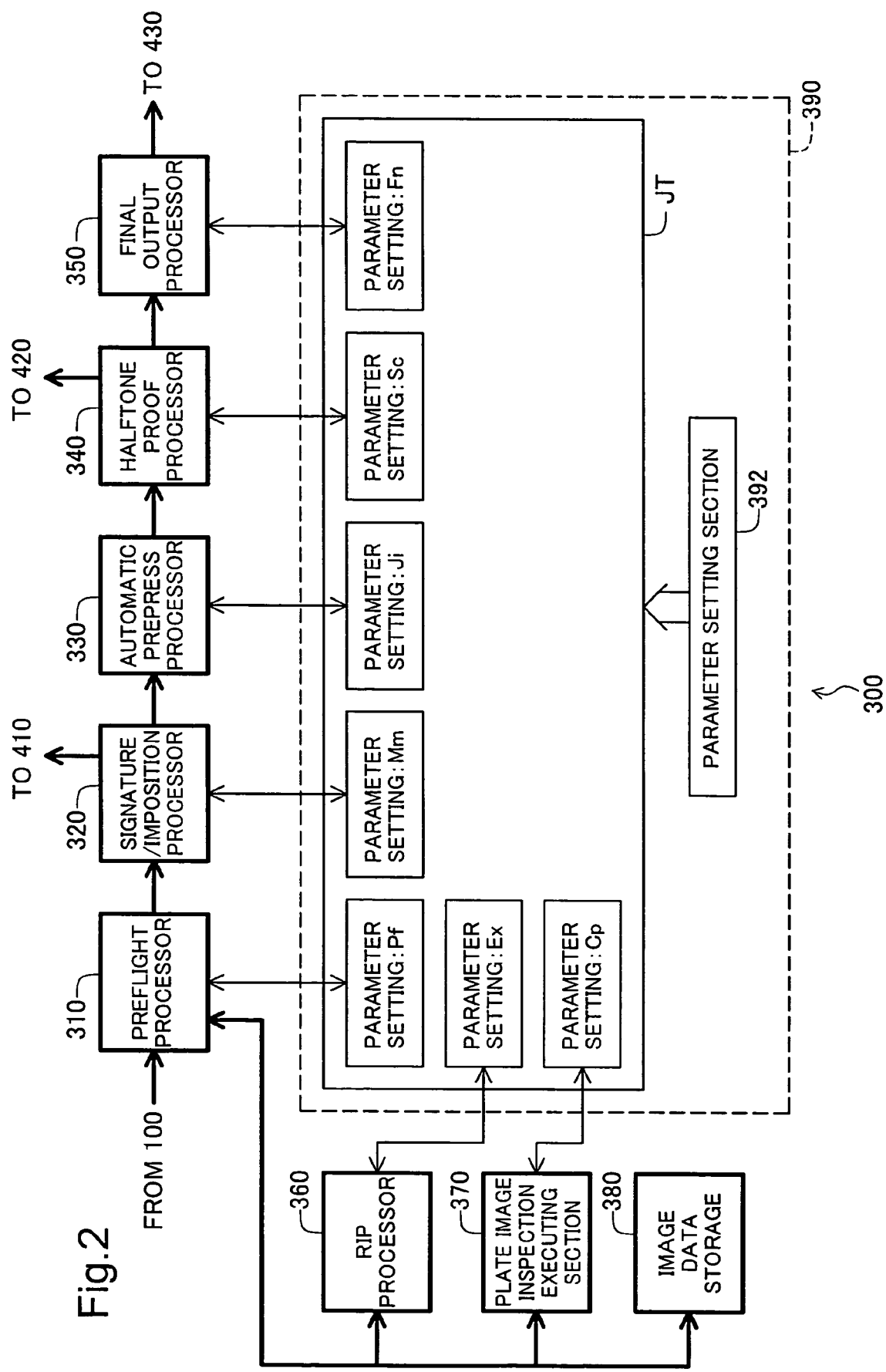
FIG. 2 is a block diagram showing the functional makeup of a workflow control system.

FIG. 2 is a block diagram showing the functional makeup of the workflow control system 300. The workflow control system 300 has the following functions of processors, for processing print image data of specific format (PDF data or PostScript data; these data formats are data formats that represent text, graphics, and bitmap images as different types of components) received from the design device 100.

(1) Preflight Processor 310:

Preflight processing, or so-called pre-processing, is a process for analyzing the contents of print image data and verifying whether the prepress process can be executed without any major problems. For example, from the description of a PDF file or PostScript file, a check is made to determine: (i) the existence of a linked object file inside the document; and (ii) the existence of non-standard font data embedded inside the document. Where there is insufficient data or file, the user is requested to add data or modify specifications. Also, print image data is converted to display resolution by a raster image processor 360, and an image of the printed matter, corresponding to the raster image data, is displayed on the display device 400 (FIG. 1). The user can use the print image displayed on the display device 400 to determine whether the print image data is appropriate.

(2) Signature/Imposition Processor 320:

This processor performs a so-called signature process and impositioning process (processes for arranging a plurality of pages on a single plate). Also, a preliminary proof according to the processed data is output by preliminary proof output unit 410 (FIG. 1). The user can perform proofing by checking the output preliminary proof. Where there are a number of outputs of different size, signature and imposition processes according to each size are carried out. For example, when the size of a preliminary proof output differs from that of a plate output, signature and imposition processes are carried out for each output.

(3) Automatic Prepress Processor 330:

This processor performs processes such as so-called inking, setting white borders, trapping. etc.

(4) Halftone Proof Processor 340:

This processor performs RIP processing (Raster Image Processing) and halftone dot processing (halftoning) to create raster image data representing plates for the respective ink colors (for example, the four colors of YMCK), according to output resolution (for example, 4000 dpi). A proof corresponding to the created data is output by means of halftone proof output unit 420 (FIG. 1). The user can carry out proofing by checking the output proof.

(5) Final Output Processor 350:

This processor creates output data appropriate for the plate output unit 430. The prepared output data is transferred to the plate output unit 430, whereupon the plate output unit 430 prepares a plate corresponding to the output data.

(6) Raster Image Processor 360:

This processor develops print image data, received for the purpose of prepress, to the display resolution of the display device 400, thereby creating raster image data. The raster image data thus created is used for display on display device 400, or for plate image inspection by a plate image inspection processor 370 (described later).

(7) Plate Image Inspection Processor 370:

This processor performs plate image inspection of raster image data. Described in detail hereinbelow.

(8) Image Data Storage 380:

This device stores raster image data created by raster image processor 360. Stored raster image data is used for inspection by plate image inspection processor 370.

The workflow control system 300 further comprises a controller 390 for controlling operations of these elements 310 through 380. Controller 390 includes a parameter setting section 392; a user can set the control parameters of each of the processors 310 though 370 by means of the parameter setting section 392. Various control parameters for one prepress operation (called a "job") are put together in a data file called a job ticket JT. That is, when the processors 310 though 370 execute a single job, the process content of each processor is controlled in accordance with the control parameters in the job ticket JT.

The functions of the processors 310 through 370 and controller 390 of the workflow control system 300 are realized by a computer (the workflow control system 300) executing a computer program stored on a hard disk, not shown, in the workflow control system 300.

B. EMBODIMENTS

B1. Setting Control Parameters

Figure 3:
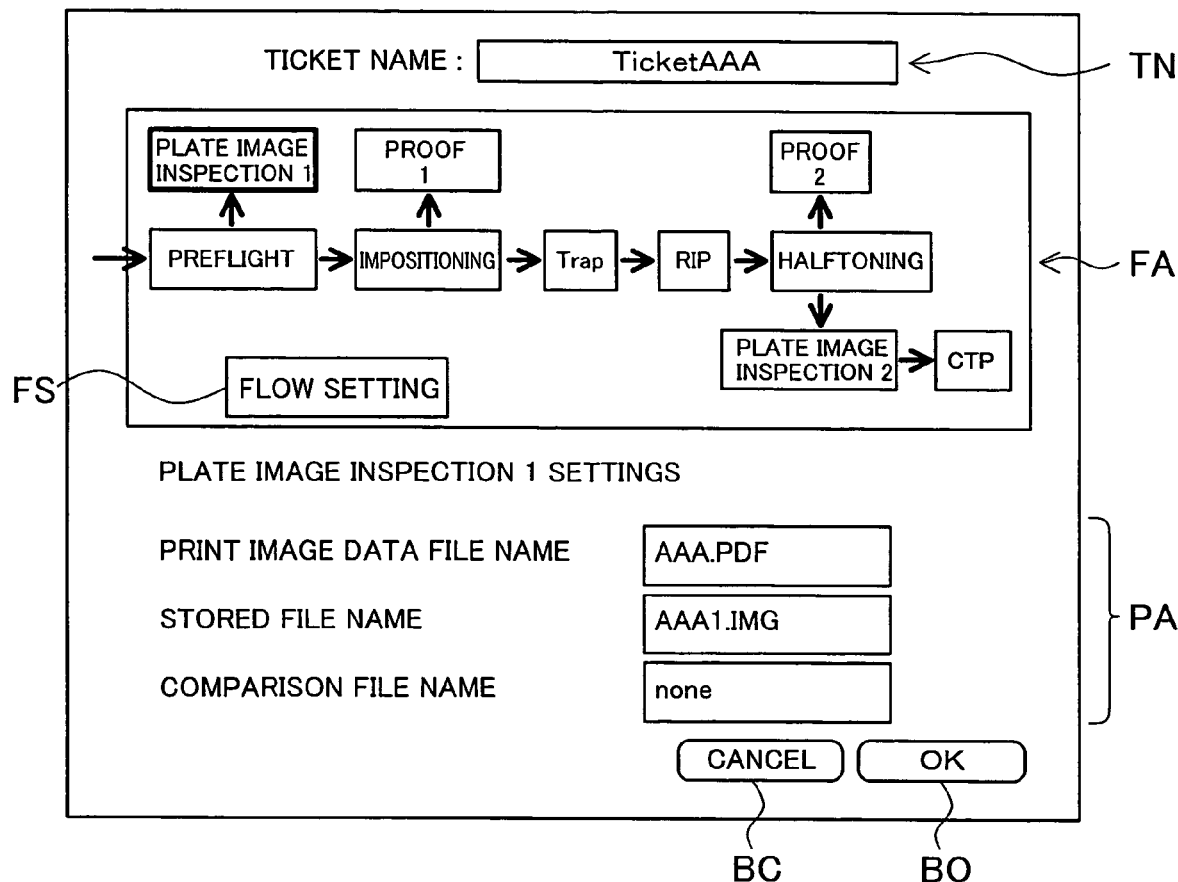
FIG. 3 illustrates the manner of setting control parameters.

FIG. 3 illustrates a window for setting control parameters. In this embodiment, the screen shown in FIG. 3 is displayed on display device 400 (FIG. 1). The user can set the flow pattern of a prepress job on this screen, and set the control parameters of each process step. The screen has a ticket name setting section TN for setting the name of a job ticket; a flow pattern setting section FA for setting the flow of the process steps; a control parameter setting section PA for setting the control parameters of each process within the flow pattern; an OK button BO for confirming settings; and a Cancel button BC for canceling settings.

The ticket name setting section TN includes a field for setting a name identifying a job ticket JT (FIG. 2). The job ticket JT is a data file that contains control parameters for process steps. Setting a new name enables new job settings to be made. When data processing is carried out subsequent to proofchecking, processing can be carried out again under the same settings, by setting the name to that used previously. Where print image data includes a job ticket name, in preferred practice, its job ticket name will be automatically used in the process. For example, where correction by means of proofing during process flow has been required, data including the job ticket name used for the process is used as the corrected print image data. In this case, since the corrected print image data already includes the job ticket name, the appropriate job ticket is selected without being set by the user.

Flow pattern setting section FA is an area for setting and confirming the flow pattern of a process to be executed. In the flow pattern shown in FIG. 3, first, preflight processing of the input print image data is performed by preflight processor 310. Plate image inspection 1 (described in detail later) is performed using raster image data that has been produced by developing print image data to display resolution. Once plate image inspection 1 is completed, an imposition process is executed by processor 320, then a proof is output from the processed data and proofing is performed (proof 1). When proofing (proof 1) is completed, a trapping process is executed by automatic prepress processor 330. Next, RIP processing is performed by halftone proof processor 340, and after halftone processing has been executed, another proofing is performed (proof 2). When proofing (proof 2) is completed, after inspection of color separation plates (plate image inspection 2) for each of the colors YMCK has been executed on the basis of raster data representing plates of each ink color, plates are generated by the CTP (plate output unit 430). Plate image inspection 2 involves, for example, comparison of separation plate data before and after proofing.

Control parameter setting section PA includes a field for setting and confirming control parameters for process steps indicated in flow pattern setting section FA. In this embodiment, parameters relating a process step selected in flow pattern setting section FA (highlighted process step) are displayed in control parameter setting section PA. In the example shown in FIG. 3, "plate image inspection 1" has been selected in flow pattern setting section FA, and three control parameters for controlling the "plate image inspection 1" process step, namely, "print image data file name", "stored file name", and "comparison file name", are shown in fields inside control parameter setting section PA. The "print image data file name" sets a file name of print image data used for prepress; the "stored file name" sets a file name for storing raster image data that has been developed to display resolution; and the "comparison file name" sets a file name for raster image data to be used in performing "plate image inspection 1." By inputting desired values into the control parameter fields, the user can set the values of the control parameters. In the absence of user settings, these are set to preset standard values. For example, in "comparison file name" the setting is the "stored file name" in the previous (prior to proofing) plate image inspection 1 process.

The process step whose control parameters are set is not limited to "plate image inspection 1"; selecting any of the process steps displayed in flow pattern setting section FA enables control parameters for the process step to be set. For example, by selecting "imposition", impositioning locations on each page of multiple-page data can be set; or by selecting the "halftoning" process, the halftone type used in the halftoning process can be set. Also, by operating the Flow Set button FS of flow pattern setting section FA, setting of the flow pattern per se can be carried out.

B2. Embodiment 1 of Plate Image Inspection

Figure 4:
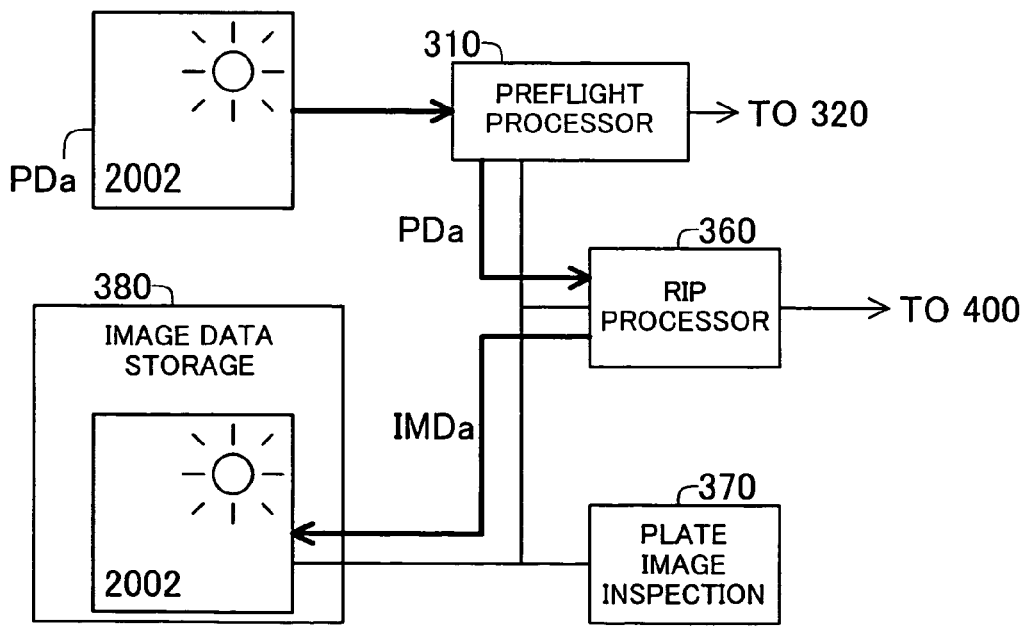
FIG. 4 illustrates plate image inspection using raster image data.

FIG. 4 illustrates plate image inspection using raster image data (corresponds to "plate image inspection 1" in FIG. 3). Plate image inspection in this embodiment is executed in order to inspect for differences between proofed print image data (second print image data) created by design device 100 (FIG. 1) and print image data prior to proofing (first print image data). Proofed print image data is created by design device 100 in the event that correction of the original has become necessary as a result of the aforementioned flow pattern proofing or inspection.

When print image data prior to proofing (first print image data) PDa is received by workflow control system 300 (FIG. 1, FIG. 2), its content is analyzed by preflight processor 310 to verify whether the prepress process can be executed without major problems. Print image data PDa is developed by raster image processor 360 to display resolution for the purpose of display of a print image on display device 400 (FIG. 1), and a print image of the developed first raster image data IMDa is displayed or previewed on display device 400 (FIG. 1). The display resolution is a value appropriate for the display device 400, for example, 72 dpi. As pixel values for display pixels, there may be used the average value of tone values (or density values) in display pixels, or tone values at center locations of display pixels. From the print image displayed on display device 400, the user can verily whether the print image data is the right data. In this plate image inspection 1 process prior to proofing, raster image data comparison is not performed; raster image data comparison will be performed after the print image data is corrected as a result of proofing. The raster image data IMDa is stored as first raster image data in image data storage 380. Within image data storage 380, a "file name" for identifying raster image data is used. The setting for "stored file name" in the control parameters for "plate image inspection 1" (FIG. 3) is used as the file name for the raster image data IMDa. In the absence of a user-specified setting, the "stored file name" setting is, for example, one determined from the print image data file name according to predetermined rule. In the example shown in FIG. 3, the file name is obtained by appending a number indicating process iteration to the print image data file name, and changing the file extension to an extension indicating raster image data format.

In the event that, as a result of preflight processing, it is verified that the prepress process can be executed without major problems, print image data PDa is sent to signature/ imposition processor 320, and processes according to the flow pattern are carried out.

Figure 5:
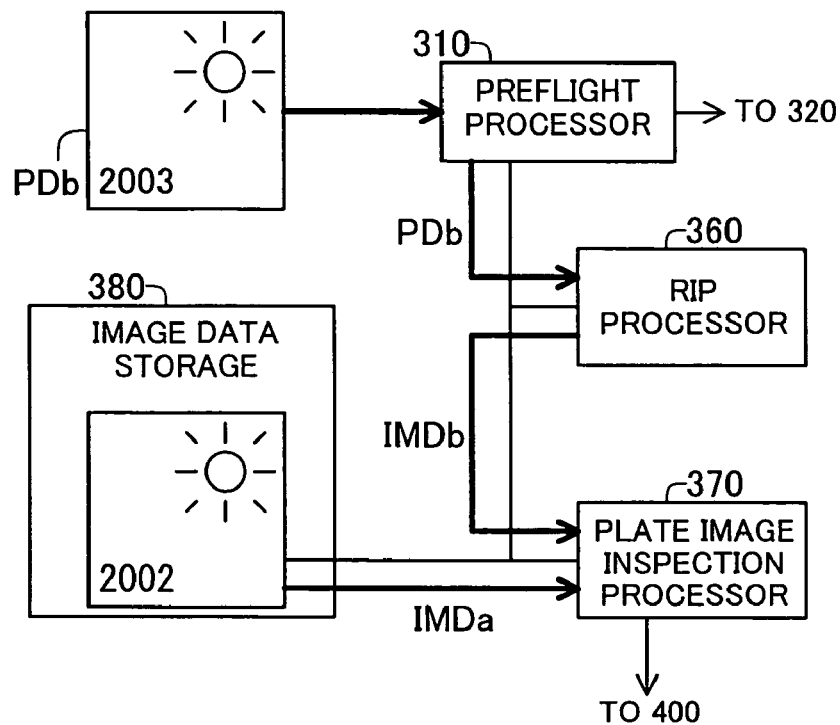
FIG. 5 illustrates processing of proofed print data.

FIG. 5 shows processing of proofed print image data PDb (second print image data). The difference from the unproofed print image data PDa of FIG. 4 is that the result of comparison of raster image data before and after proofing (result of plate image inspection process) is displayed on display device 400 (FIG. 1). The proofed print image data PDb is developed by raster image processor 360 to produce raster image data IMDb. The plate image inspection processor 370 reads in the proofed raster image data IMDb, and the unproofed raster image data IMDa stored in image data storage 380, and performs a plate image inspection process to compare the two sets of raster image data. The result of the plate image inspection process is displayed on display device 400. Plate image inspection processor 370 uses the setting for "comparison file name" in the control parameters for "plate image inspection 1" (FIG. 3) as the file name for identifying the raster image data to be read from image data storage 380. In the absence of a user-specified setting, the "comparison file name" setting is the stored file name used when the raster image data was stored in the previous (prior to proofing) plate image inspection 1 process. That is, in this embodiment, the file name setting is that of the raster image data IMDa prior to proofing.

Figure 6:
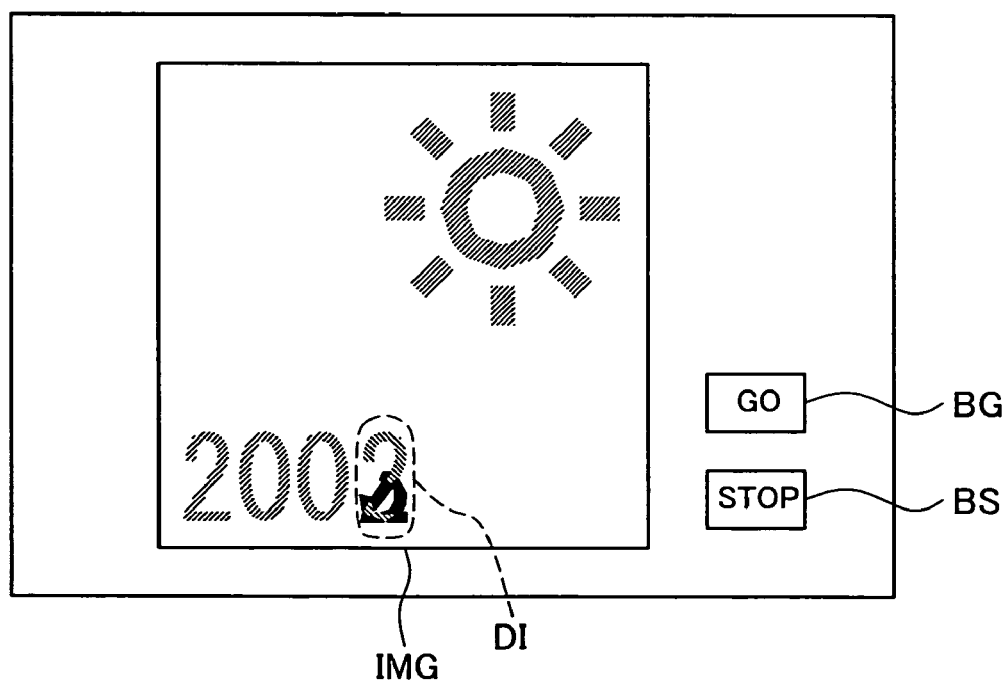
FIG. 6 illustrates a plate image inspection results screen.

FIG. 6 shows a plate image inspection results screen shown on display device 400. On the screen shown in FIG. 6 there are displayed a button BG for proceeding with the process, and a button BS for stopping the process. In this embodiment, plate image inspection processor 370 calculates, for each pixel location, the difference in pixel value of pixels at the same location in the two sets of raster image data IMDa, IMDb, and creates plate image inspection result data constituted the pixel value differences. When displaying the plate image inspection result data IMG, pixels whose pixel value difference is greater than a predetermined threshold value are displayed darker, while pixels below the threshold value are displayed lighter. In this embodiment, through correction caused by proofing, the number "2" in area D1 is changed to "3." In the screen shown in FIG. 6, in the area D1 in which this change has been made, pixels whose pixel value difference has become greater are displayed darker, while other pixels with small pixel value difference are displayed lighter. By means of highlighted display pixels whose pixel value difference exceeds a threshold value, i.e. locations where change has taken place, the user is able to readily confirm locations of changes. Where the range of possible pixel values is 0-255, for example, the threshold value may be 30. A greater threshold value means that only pixels with greater pixel value difference are highlighted. That is, with a greater the threshold value, it is possible to carry out plate image inspection so as to confirm only large differences.

By inspecting a screen having locations of change displayed prominently, the user is able to readily determine whether correction has been carried out properly, that is, determine whether there are any missing or mispositioned characters, whether there are any mispositioned lines, and whether images are the proper ones. In the event that the user determines that correction has been performed properly, the process can proceed by operating button BG. In the event that correction has not been performed properly, or a non-designated area has been modified in error, the process can be stopped by operating button BS.

Incidentally, display resolution is typically lower than final output resolution (plate data resolution). Thus, in this embodiment, plate image inspection can be carried out more rapidly than would plate image inspection using image data at output resolution. In some instances, smaller images or text may appear deformed when developed to the lower display resolution. However, where two sets of raster image data are developed at the same resolution, such deformation will be the same in each, so that plate image inspection of fine characters may nevertheless be carried out properly.

As the resolution for raster image data (display resolution), it would be possible to use the standard resolution for displaying the printed matter at substantially actual size on display device 400 (e.g., 72 dpi), or to use a resolution lower than the standard resolution (e.g., 36 dpi) or higher than the standard resolution (e.g., 144 dpi). By using the standard resolution for display device 400 it is possible to display an image on display device 400 that is the same size as the actual printed matter, which enables the user to better confirm placement of text and images. Lower resolution allows plate image inspection to be carried out more quickly, while higher resolution enables plate image inspection to be carried out with a higher degree of precision. In any case, by performing plate image inspection using developed data that has been developed to display resolution for the purpose of displaying (previewing) a print image on display device 400, the need for developing of print image data to output resolution is obviated at the time of plate image inspection, so that previewing and plate image inspection can be carried out rapidly. An arrangement whereby display resolution can be set by the user is also possible. By so doing, the user can obtain plate image inspection results at a resolution suitable for particular print image data. An arrangement whereby, when displaying a print image and plate image inspection results on display device 400, an enlarged or reduced display having resolution different from display resolution can be displayed in response to user command may also be provided. By so doing, the use can better verify print image data and confirm plate image inspection results.

In the embodiment described hereinabove, the plate image inspection process is carried out using raster image data obtained by developing print image data received for purposes of prepress to display resolution. That is, prior to executing the imposition process, trapping process, RIP process, halftoning process and other data processing processes, it is first determined whether change accompanying proofing has been carried out properly. It is therefore possible to reduce instances of such data processing processes being performed in the event that correction has not been carried out properly.

There may be various methods for highlighting locations of change: they may flash, or be surrounded by a border. Locations of change could also be displayed enlarged, or displayed in a specific color.

Where print image data includes a plurality of color components (RGB, YMCK) rather than being monochrome data, in preferred practice, raster image processor 360 may create raster image data for each color component, and plate image inspection processor 370 may perform plate image inspection appropriately on a color-by-color basis. In this case, plate image inspection results for each color component may be displayed together on a single screen, with pixels whose pixel value difference for any color component exceeds a threshold value displayed in highlight; or plate image inspection results for each color component may be displayed separately. The threshold value may be set to different values for different color components.

In this embodiment, plate image inspection is described as being performed before and after proofing, but a similar process would be carried out where proofing is performed multiple times. That is, each time that new print image data is received, raster image processor 360 creates raster image data developed to the display resolution, and the raster image data so created is stored in image data storage 380. Plate image inspection processor 370 executes the plate image inspection process using the newly created raster image data and raster image data designated by the "comparison file name" control parameter, and the results of the plate image inspection process are displayed on display device 400. In the absence of a user setting, the setting for the "comparison file name" is the "stored file name used when the raster image data was stored in the previous plate image inspection 1 process. By so doing, appropriate pre- and post-proofing plate image inspection can be executed rapidly, regardless of the number of times proofing is done.

In this embodiment, by setting the "comparison file name" control parameter setting, it is possible to designate raster image data based on print image data for another printed matter as first raster image data used in plate image inspection. For example, in some instances, one may be creating several plates for posters each containing artwork and the name of a business. The plurality of plates have the same artwork but different business names. The method here would be to complete proofing for one of the plates, and then match the artwork of the other plates to the completed plate. In this case, by setting the raster image data of the proofed plate as the raster image data used for the other plates, plate image inspection of the artwork component can be carried out appropriately.

B3. Embodiment 2 of Plate Image Inspection

Figure 7:
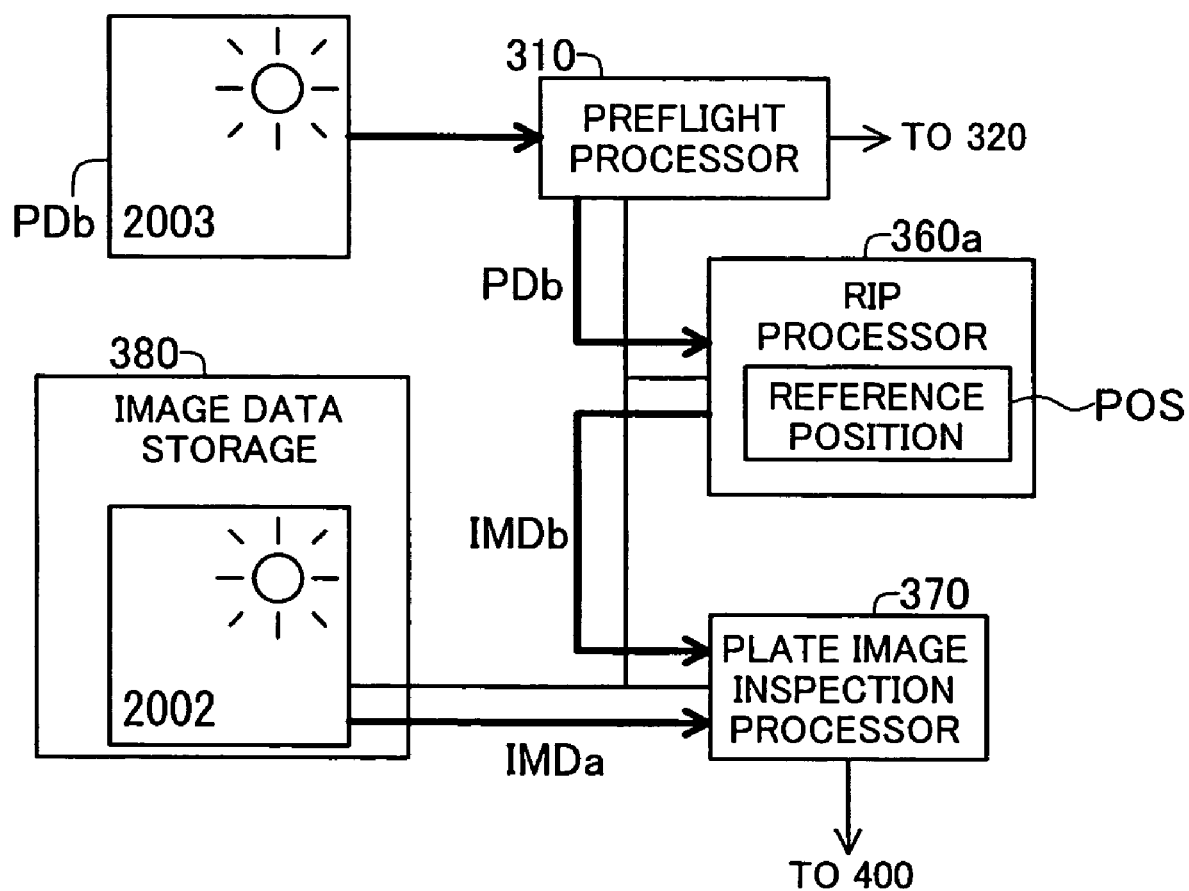
FIG. 7 illustrates a second embodiment of plate image inspection using raster image data.

FIG. 7 illustrates a second embodiment of plate image inspection. The difference from the embodiment 1 is that the user can set the reference image position in a print area for development of print image data to display resolution by raster image processor 360a. That is, instead of a predetermined reference position, raster image processor 360a uses a desired reference position POS set by the user, to execute development of print image data PDb. Plate image inspection processor 370 executes a plate image inspection process using first raster image data IMDa stored in image data storage 380, and second raster image data IMDb that has been developed according to the selected reference position POS, and displays the results of the plate image inspection process on display device 400.

Figure 8A:
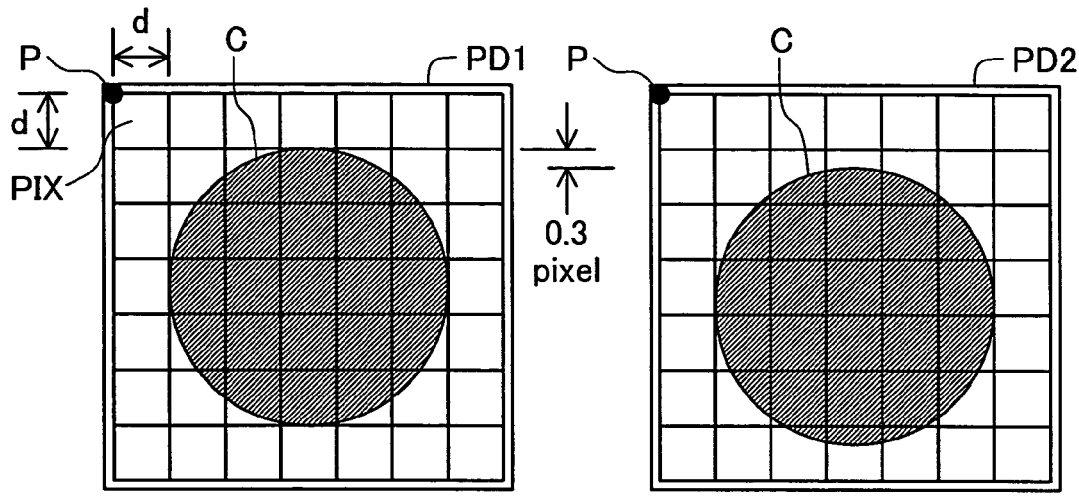
FIGS. 8(a)-8(c) illustrate the effect of reference image position on the pixel value difference.
Figure 8B:
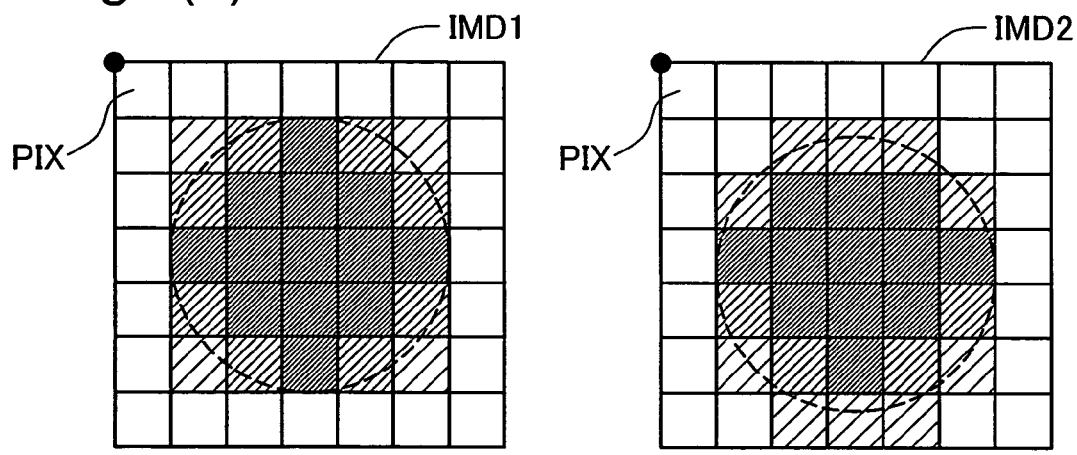
Figure 8C:
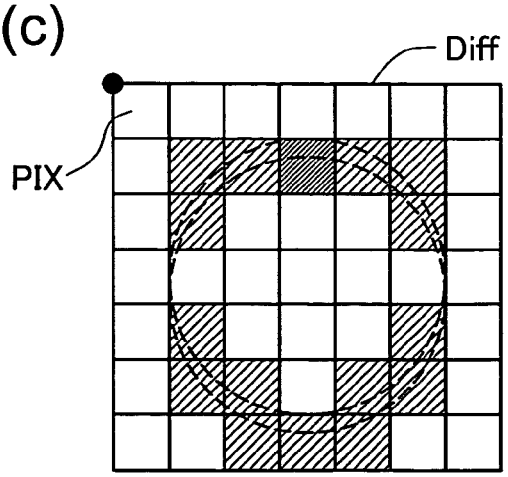

FIGS. 8(a) through 8(c) illustrate the effect of reference position on the pixel value difference. Image PD1 and image PD2 shown in FIG. 8(a) are both represented by the same print image data. The two images PD1 and PD2 each have the same image object C recorded as the print image. This image object C is a circle that has been filled in to a given depth of shade (tone value). The grid shown on each image represents a collection of pixels (display pixels) PIX for development, provided in reference to a reference position P in the print area. Development pixels PIX are arranged at pixel pitch d at display resolution. The difference between image PD1 and image PD2 is that the position of circle C is offset by a distance smaller than pixel pitch d (in the example in FIGS. 8(a) and 8(b), offset by 0.3 pixel). When print image data is created, it is possible to specify positions of text, images, and other image objects in finer units than the display resolution. Thus, in some instances, the position of an image object may be corrected by a distance smaller than pixel pitch d, as in this example.

Image IMD1 shown in FIG. 8(b) represents raster image data corresponding to image PD1, and image IMD2 represents raster image data corresponding to image PD2. The density of the hatching filling in pixels PIX represents pixel values of pixels, with deeper shade indicating greater pixel value. Pixel values of display pixels are set, for example, to the average value for depth of shade of the original print image in the display pixels. As shown in FIG. 8(b), in raster image data IMD1 corresponding to image PD1, circle C is accommodated within a 5×5-pixel square. In raster image data IMD2 corresponding to image PD2, which is the same circle C but offset by a distance smaller than pixel pitch d, circle C is not accommodated within a 5×5-pixel square.

FIG. 8(c) is an illustration of the pixel value difference Diff obtained from the two sets of raster image data IMD1, IMD2. The density of the hatching filling in the pixels PIX represents pixel value differences of pixels, with deeper shade indicating greater pixel value difference. In this way, despite the fact that the two original image objects C are the same size, their positions deviate slightly, so pixel value difference is no longer zero. Thus, when plate image inspection results are displayed, the area of positional deviation is displayed highlighted as a location of change. Such small deviation in position can be produced, for example, in design device 100 (FIG. 1) when the designated position of an object is changed. However, in many instances, such small deviation is not recognizable in the final printed matter, so in many cases it can be ignored during actual prepress process. Thus, it is convenient for the user to be able to distinguish when a highlighted location of change has resulted from a slight deviation in positioning of an object, or has resulted from a change occurring during proofing. Accordingly, this embodiment is designed so that plate image inspection results in which the two images PD1, PD2 shown in FIG. 8(a) are substantially aligned can be obtained by adjusting the reference position for development by a distance smaller than the pixel pitch d.

Figure 9A:
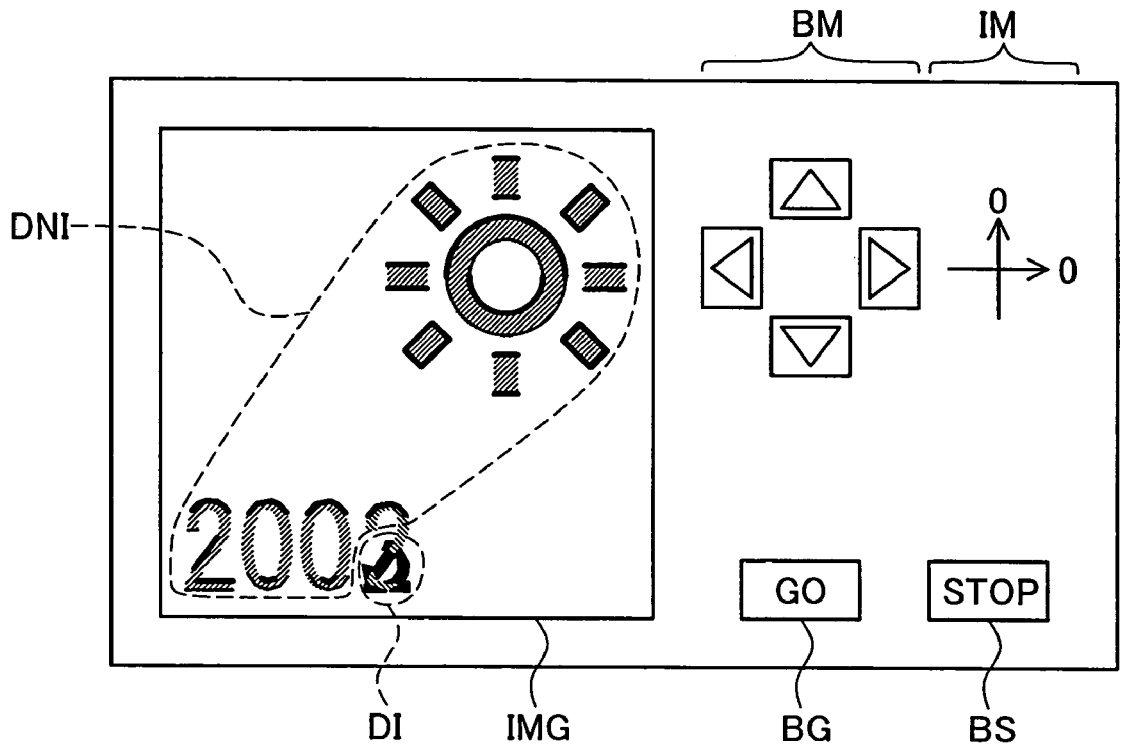
FIGS. 9(a) and 9(b) illustrate a plate image inspection results screen.
Figure 9B:
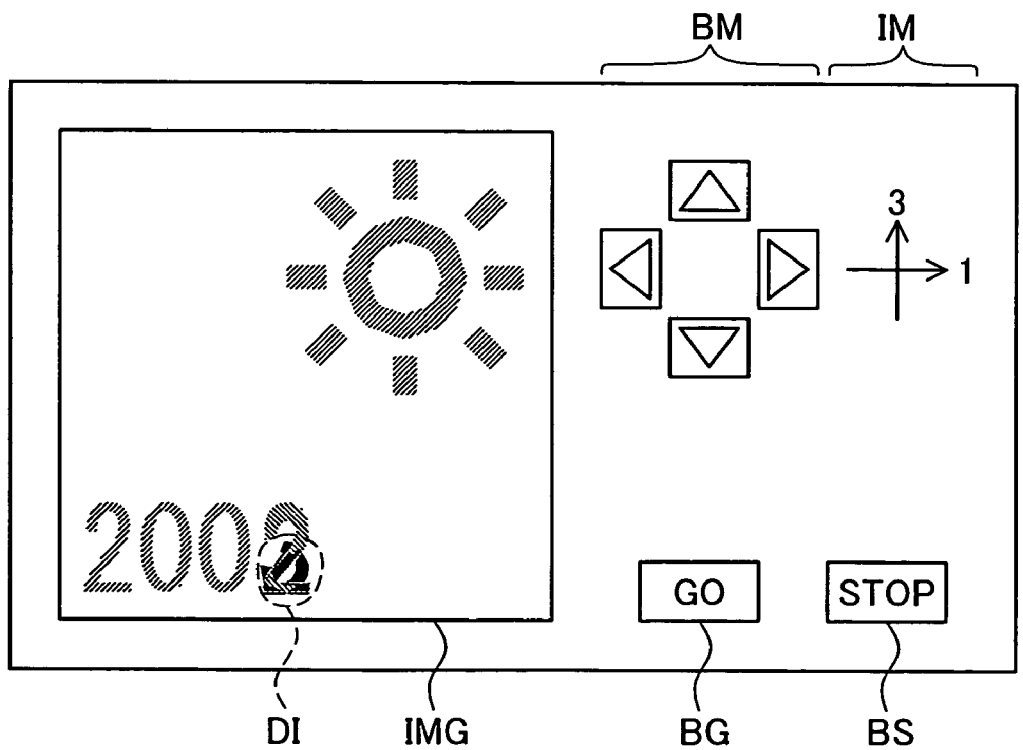

FIGS. 9(a) and 9(b) show a plate image inspection results screen displayed on display device 400 in Embodiment 2. The difference from FIG. 6 is that there is provided a position adjusting section BM for setting the development reference position POS (FIG. 7) that determines the reference position for development of print image data. By operating the position adjusting section BM, the user can move the development reference position in two orthogonal directions, thereby allowing the development reference position to be moved in any direction on the print area. In particular, it is possible to move it by a distance smaller than the display resolution, making it possible, for example, to move it in units of the pixel pitch of the final output resolution. The movement distance display section IM on the screen displays the distance over which the development reference position has been moved. In preferred practice, the range of possible movement will be limited to within a predetermined distance (for example 1 mm).

FIG. 9(a) shows the screen prior to adjusting development reference position. In the plate image inspection result IMG shown on the screen, an area DN1 that includes a location of change resulting from slight positional deviation of an image object, and an area D1 that includes a location of change produced during proofing, are shown in highlighted display. The user can move the development reference position by operating position adjusting section BM. Raster image processor 360a (FIG. 7) creates second raster image data according to the moved reference position, and plate image inspection processor 370 executes a plate image inspection process on the newly created second raster image data, and displays the plate image inspection results on display device 400, i.e., displays the plate image inspection result IMG shown in FIG. 9(b) or 9(b). Using the displayed plate image inspection result, the user can decide whether the reference position has been properly set. If there are few pixels having large pixel value difference in the displayed plate image inspection result IMG, it can be concluded that the reference position has been set properly. By repeatedly moving the reference position and checking the plate image inspection result, the user can move the reference position to a more appropriate location.

FIG. 9(b) shows the screen after reference position has been adjusted. By moving appropriately the reference position in this manner, it is possible to avoid making a determination that placement of an object is in error, due to slight positional deviation of the object It is therefore possible to make more appropriate decisions as to whether change accompanying proofing has been performed properly.

B4. Embodiment 3 of Plate Image Inspection

Figure 10:
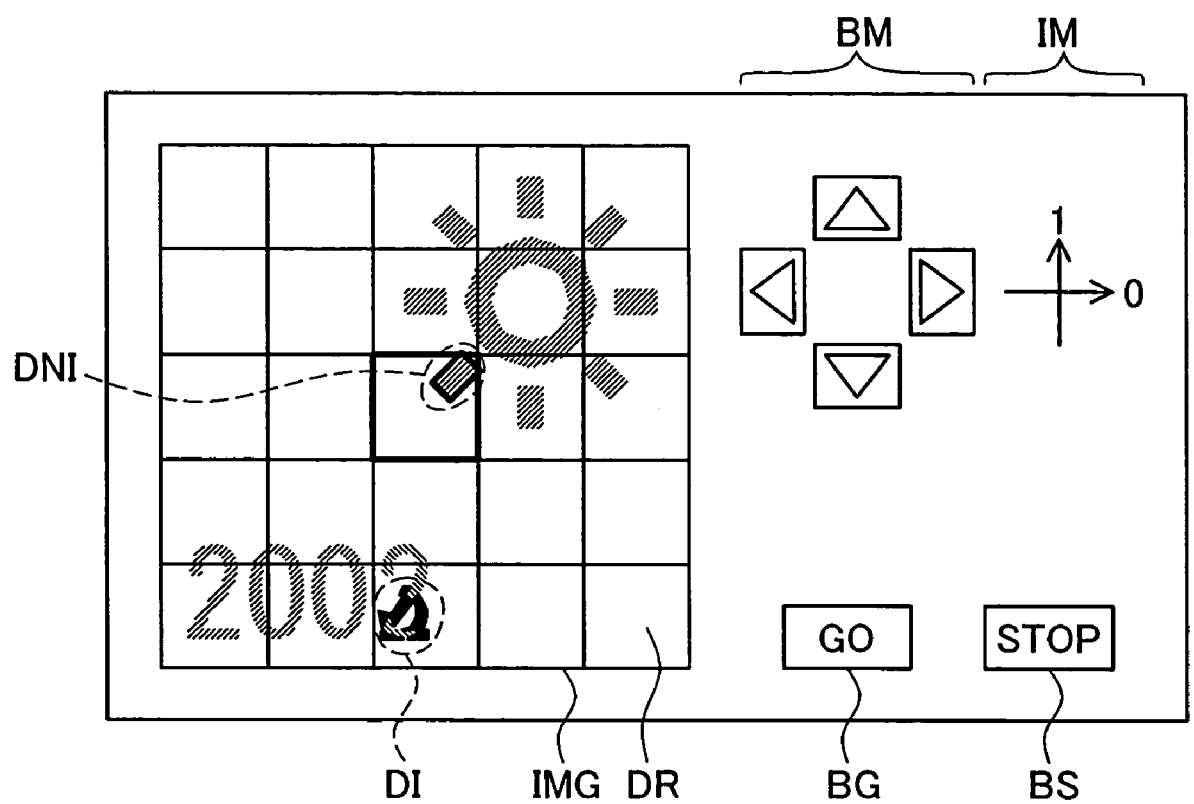
FIG. 10 illustrates a plate image inspection results screen.

FIG. 10 is an illustration of plate image inspection results screen shown on display device 400 in this embodiment. The difference from the results shown in FIGS. 9(a) and 9(b) is that the print area in which print image data is displayed is divided into a plurality of areas, with reference position independently settable in each of this plurality of areas. The plate image inspection process image IMG shown on the screen in FIG. 10 is divided into a plurality of areas DR (in this example, 5×5 for a total of 25 areas), with the selected area shown highlighted. Each area is composed of a given number of display pixels. Using position adjusting section BM, the user moves the reference position of a selected area, whereupon the distance that the reference position was moved in the selected area is indicated by movement distance display section IM.

In each area in plate image inspection process image IMG there is displayed a plate image inspection result obtained using second raster image data according to a reference position associated with the individual area. Plate image inspection results for each area are combined and displayed as a single print area. By checking the plate image inspection process image IMG, and adjusting reference position for highlighted areas having large pixel value difference, the user can suppress highlighting of locations of change resulting from slight deviation in position of an image object. In this embodiment, different reference positions can be set on an area-by-area basis. Thus, even where the direction and distance of slight positional deviation of an object within a printed matter differ with the position thereof within a print area, it is possible to avoid highlighting locations of change due merely of slight positional deviation of an object, and consequent determination that placement of the object is in error.

B5. Embodiment 4 of Plate Image Inspection

Figure 11A:
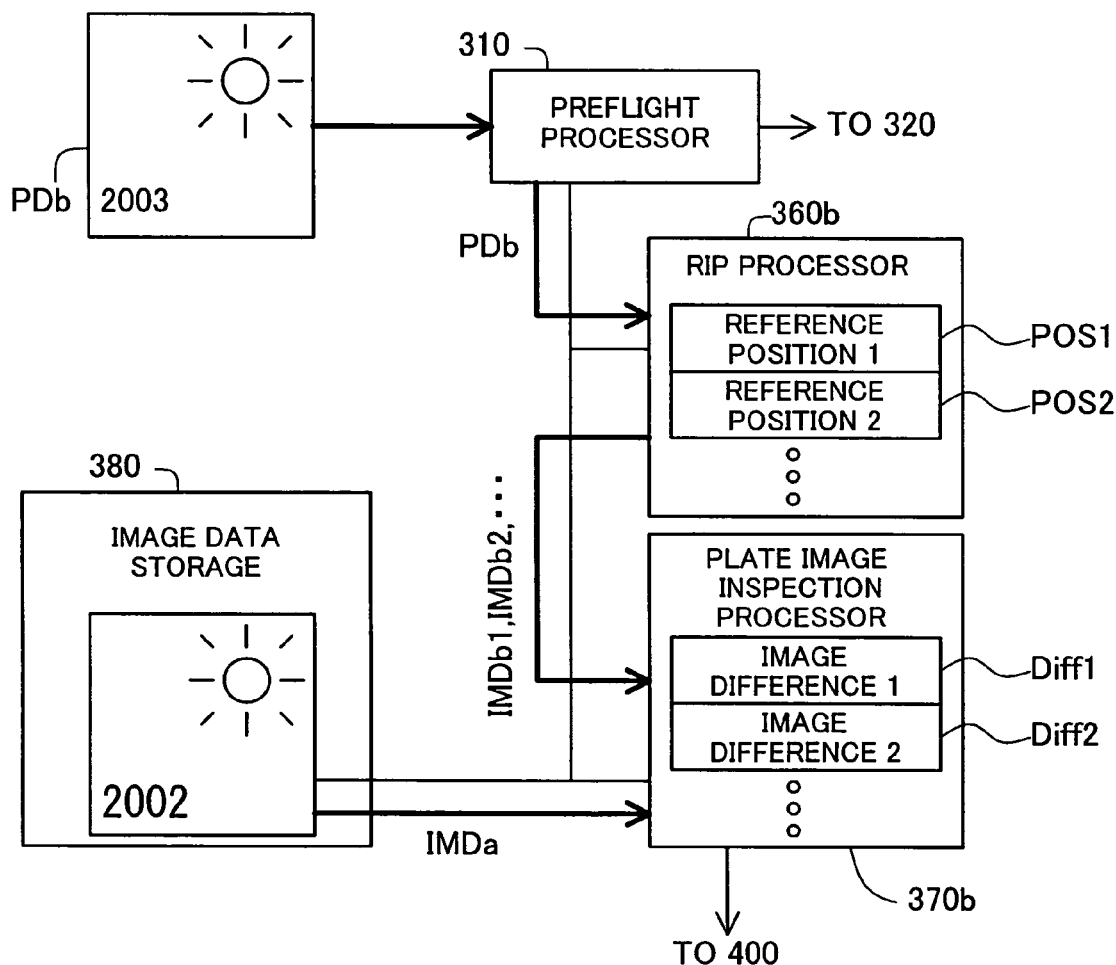
FIGS. 11(a) and 11(b) illustrate a fourth embodiment of plate image inspection using raster image data.
Figure 11B:
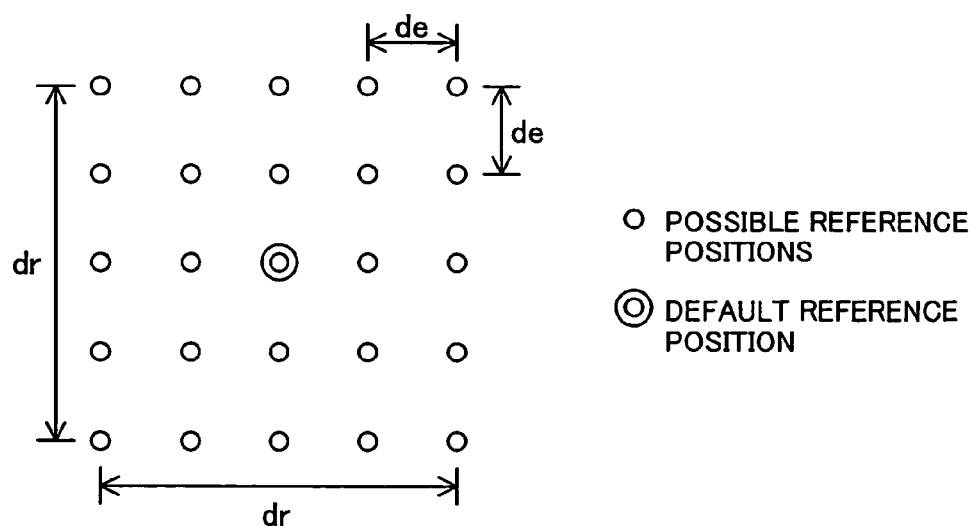

FIGS. 11(a) and 11(b) illustrate a fourth embodiment of plate image inspection. The difference from the example in FIG. 7 is that a plurality of development reference positions for the entire image are established in advance. At the plurality of development reference positions, there may be employed, for example, reference positions arranged at equal intervals on the vertical and horizontal at pitch de, as shown in FIG. 11(b). Here, pitch de can be a value smaller than the display resolution pixel pitch d; for example, the final output resolution pixel pitch could be used. In preferred practice, the range dr over which reference positions provided by the plurality of development reference positions can be moved will be limited to within a predetermined distance (1 mm, for example).

As shown in FIG. 11(a), raster image processor 360b creates plural sets of second raster image data, according to the plurality of development reference positions, respectively. Plate image inspection processor 370b executes plate image inspection processing using the plural sets of second raster image data (IMDb1, IMDb2 . . . ) developed with reference to the plurality of reference positions (POS1, POS2 . . . ), and first raster image data IMDa stored in image data storage 380. At this time, an image difference magnitude that represents the magnitude of difference in raster image data is calculated for each plate image inspection result. As this image difference magnitude, there could be used, for example, the total value summed for the entire image of pixel value differences in two sets of raster image data used in a plate image inspection process. Plate image inspection processor 370b searches for the smallest value among the plurality of image difference magnitudes (Diff1, Diff2 . . . ) so obtained, and displays the plate image inspection result corresponding to this smallest value on display device 400 (FIG. 1).

In this embodiment, a plate image inspection result corresponding to a development reference position that gives the smallest image difference magnitude (in this example, the sum total of pixel value differences), i.e., minimizes the number of pixels having large pixel value difference, is selected automatically and displayed, whereby a plate image inspection result in which locations of change caused by slight positional deviation are not highlighted may be obtained, without the user having to set the development reference position. Thus, the user can readily determine whether change accompanying proofing has been performed properly.

The raster image processor 360b and plate image inspection processor 370b in FIG. 11 may be designed to perform plate image inspection for a plurality of areas obtained by dividing up the print area as in the example of FIG. 10. In this case, an arrangement whereby plate image inspection results are selected and displayed on an area-by-area basis is preferable. That is, plate image inspection processor 370b performs plate image inspection and image difference magnitude calculations on an area-by-area basis, and selects and displays on an area-by-area basis the plate image inspection result corresponding to the smallest image difference magnitude. By so doing, even where the direction and distance of slight positional deviation of a component within a printed matter differ with the position thereof within a print area, there can be obtained a plate image inspection result in which locations of change caused by slight positional deviation are not highlighted, without the user having to set the development reference position.

B6. Embodiment 5 of Plate Image Inspection

Figure 12:
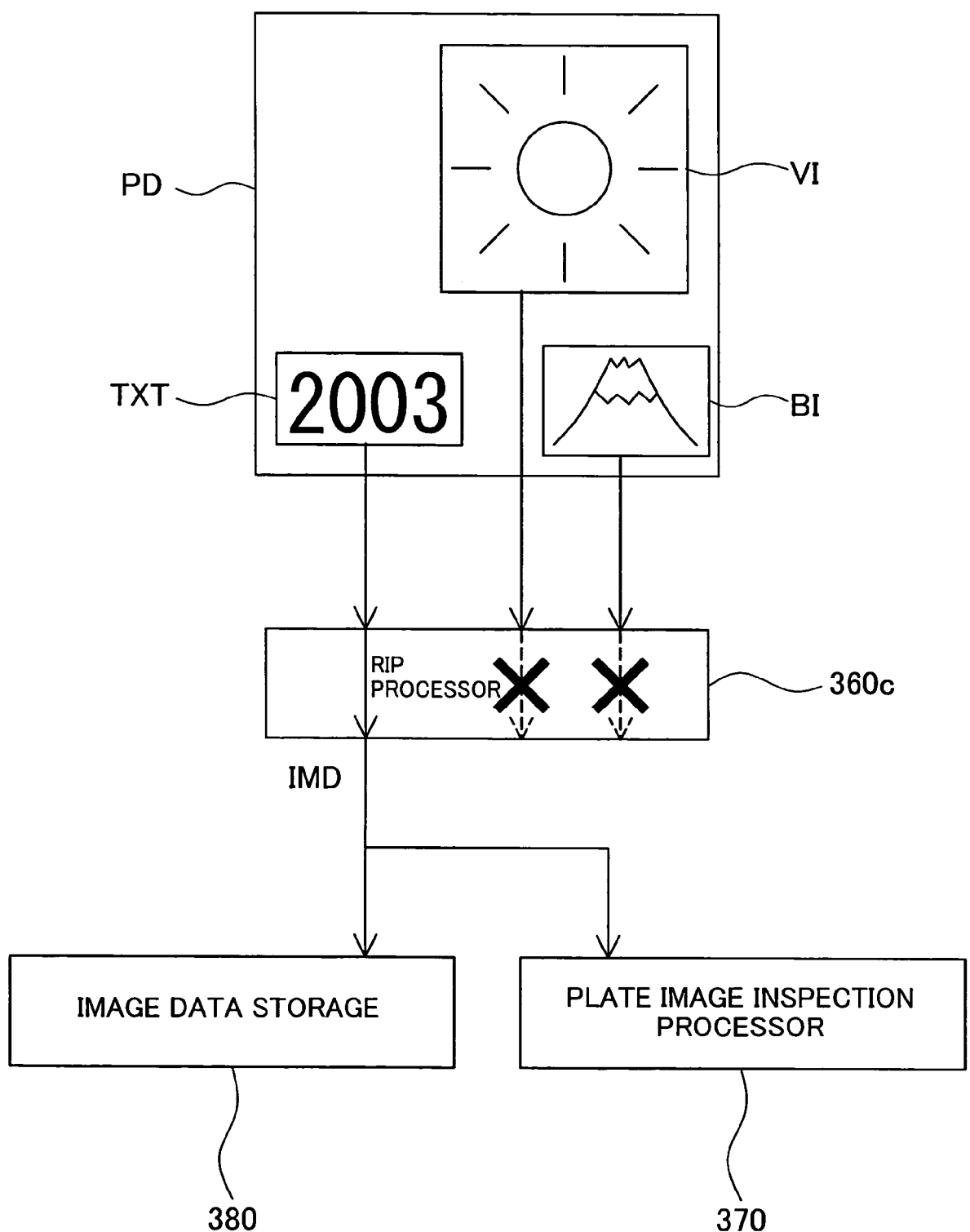
FIG. 12 illustrates a fifth embodiment of plate image inspection using raster image data.

FIG. 12 illustrates a fifth embodiment of plate image inspection. The difference from preceding embodiments is that where print image data is composed of a plurality of different types of image objects, the raster image processor 360c performs development using only certain types of objects among this plurality of types. In the example shown in FIG. 12, print image data PD is composed of three types of objects, namely, text (characters) TXT, vector images (graphics) V1, and bitmap images B1. Formats for such print image data include the PDF format or PostScript format. Of these objects, raster image processor 360c uses only text type objects TXT to create raster image data for use in inspection. The raster image data thus created is stored in image data storage 380, and used in plate image inspection processing by plate image inspection processor 370.

In plate image inspection of graphics or bitmap images, there are instances in which a given image has a large image difference magnitude of the overall image area, due to slight positional deviation of the image. In such cases, there are many instances in which the entire image area is displayed highlighted in the plate image inspection result, but can be handled as a location of no change. Thus, it is convenient for the user to be able to distinguish between highlighted locations of change that are produced by slight positional deviation of an object, and those produced by changes that accompany proofing. However, in low-resolution plate image inspection at display resolution, it may be difficult in some instances to determine whether a change location is due to slight positional deviation of an object or to a change accompanying proofing. By carrying out plate image inspection processing at display resolution using characters only, as in this embodiment, the user can efficiently check change locations pre- and post-proofing. Additionally, where plate image inspection processing at display resolution may be performed using only some types of objects, as in this embodiment, it will be preferable to use all types of objects when performing plate image inspection at high resolution (e.g. plate image inspection 2 in FIG. 3).

B7. Embodiment 6 of Plate Image Inspection

Figure 13A:
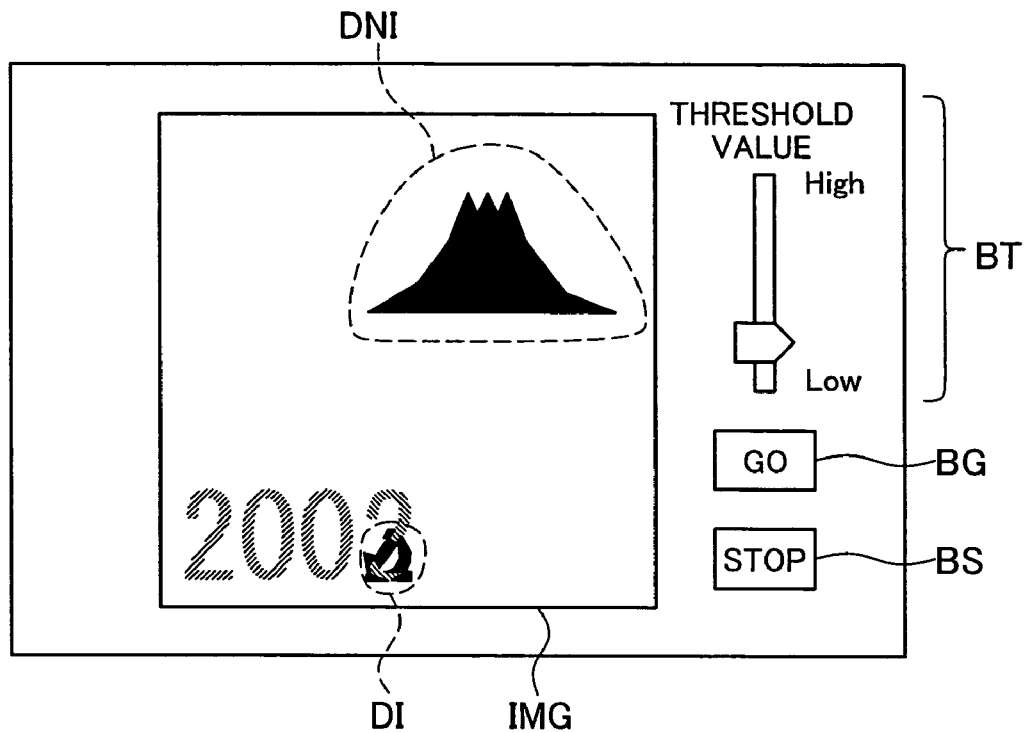
FIGS. 13(a) and 13(b) illustrate a sixth embodiment of plate image inspection using raster image data.
Figure 13B:
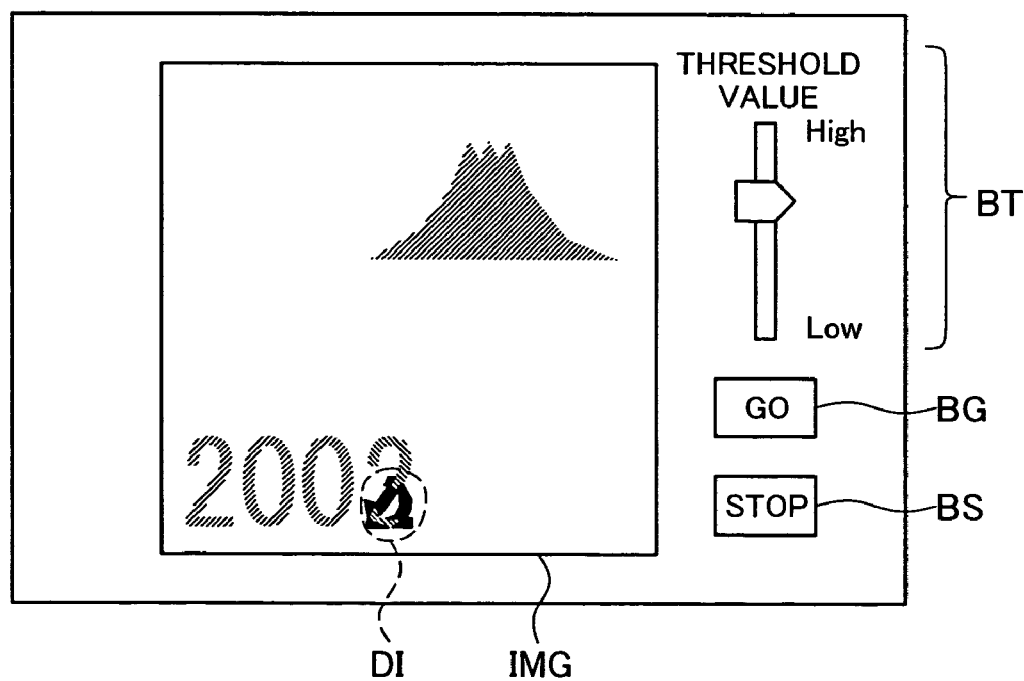

FIGS. 13(a) and 13(b) illustrate plate image inspection result screens shown on display device 400 in this embodiment. The difference from the preceding embodiments is that the result screen includes a threshold setting section BT for setting the threshold value that is used to evaluate the image difference magnitude (determine whether changes are present). By controlling the threshold setting section BT, the user can adjust the threshold value. On the basis of the threshold value setting, the plate image inspection processor determines the magnitude of image difference (for example, the difference in pixel value in pixels at the same location in two sets of raster image data used in plate image inspection processing), i.e. determines whether changes are present.

When performing plate image inspection of print image data that includes images, there are instances in which deviation of image position by even a very slight distance results in the pixel value difference of the image area overall being no longer zero. Thus, in the plate image inspection result, the entire image may be displayed in highlight.

FIG. 13(a) shows a plate image inspection result screen when the threshold value is adjusted to a low setting. In the plate image inspection result image IMG shown on the screen, an area DN1 that includes a location of change resulting from slight positional deviation of a component, and an area D1 that includes a location of change produced during proofing, are displayed so as to stand out. From this screen, the user first checks whether the locations displayed in highlight are locations of change due to slight positional deviation of an object, or locations of change accompanying proofing. As regards locations of change accompanying proofing, it is preferable to check whether the change has been made as per the proofing.

FIG. 13(b) shows a plate image inspection result screen when the threshold value is adjusted to a high setting. In the plate image inspection result image IMG shown on the screen, an area D1 of large pixel value difference is displayed in highlight. The difference from FIG. 13(a) is that the area DN1 including a location of change resulting from slight positional deviation of an object is not highlighted in display. While the pixel value difference of a location of change resulting from slight positional deviation of an object is not zero, it is usually small, and for this reason, highlighted display of locations of change resulting from slight positional deviation of an object can typically be suppressed by adjusting the threshold value upward. This decreases the effort needed on the part of the user to check whether areas of highlighted display are locations of change resulting from slight positional deviation.

Where print image data includes a plurality of color components (RGB, YMCK) rather than being monochrome data, in preferred practice, the threshold value for evaluating the magnitude of pixel value difference may be independently adjustable for each color component. By so doing, plate image inspection can be carried out appropriately on a color-by-color basis.

According to the embodiments set forth hereinabove, plate image inspection is carried out using raster image data that has been developed to the display resolution, so that plate image inspection can be executed rapidly. Since plate image inspection using raster image data that has been developed from print image data is performed prior to data processing, execution of unnecessary data processing can be reduced.

C. VARIANT EXAMPLES

C1. Variant Example 1

The arrangement of the prepress system is not limited to that shown in FIG. 1 or FIG. 2; any arrangement that suitably combines processors having the processing functions required for prepress is acceptable. As regards processors, rather that realizing their functions through software, an arrangement that provides independent devices for realizing their functions is acceptable. For example, an arrangement wherein an RIP processing device is connected to the workflow control system 300 (FIG. 1, FIG. 2), and RIP processing executed by the RIP processing device, is also acceptable. The display device 400 and workflow control system 300 may be connected over a network, so that users can carry out processing over the network. An arrangement wherein a printer is connected to workflow control system 300, and print image data corresponding to a printed matter is created by workflow control system 300 and sent to the printer to create printed matter is also acceptable. In this case, it will be preferable for the final output processing section 350 to create print image data adapted to the particular printer. By so doing, users can easily produce hard copy printed matters.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A prepress system comprising:
   a raster image processor configured to develop first print image data to display resolution to create first raster image data, and to develop second print image data to the display resolution to create second raster image data;
   a data storage configured to store the first raster image data created in advance prior to creation of the second raster image data;
   a plate image inspection processor configured to execute a plate image inspection process by comparing the first and second raster image data, and to display on a display device a result of the plate image inspection process; and
   a controller configured to control the raster image processor, the data storage, and the plate image inspection processor, wherein
   the controller includes a parameter setting section configured to set a flow pattern of a prepress process,
   the second print image data is proofed data of the first print image data,
   the parameter setting section sets a first flow pattern of the prepress process for the first print image data and a second flow pattern of the prepress process for the second print image data, the first flow pattern including a step where the data storage stores the first raster image data obtained by the raster image processor, the second flow pattern including a step where the plate image inspection processor executes the plate image inspection process by comparing the first and second raster image data,
   upon receiving the first print image data, the controller executes the prepress process according to the first flow pattern where the controller causes the data storage to store the first raster image data, and
   upon receiving the second print image data, the controller executes the prepress process according to the second flow pattern where the controller causes the plate image inspection processor to execute the plate image inspection process.

2. A prepress system according to claim 1, wherein the print image data may include a text object, a graphics object, and a bitmap image object in respective formats.

3. A prepress system according to claim 1, wherein the plate image inspection process includes calculating, for each pixel location, a pixel value difference between the first and second raster image data, and
   the result of the plate image inspection process distinctly displays pixels whose pixel value difference is greater than a threshold value, which can be adjusted by a user.

4. A prepress system according to claim 1, wherein the plate image inspection processor enables a user to select the first raster image data for use in the plate image inspection process.

5. A prepress system according to claim 1, wherein
   if the print image data includes plural types of image objects, the developing is performed using at least one specific type but not all types of image objects.

6. A prepress system according to claim 1, wherein the raster image processor is capable of re-developing the second print image data after a reference image position for image development being moved by a distance smaller than a pixel pitch at the display resolution.

7. A prepress system according to claim 6, wherein the raster image processor divides a print area represented by the second print image data into a plurality of divisional areas each having an individual reference image position for image development; and
   the plate image inspection processor determines independently the plate image inspection result for each of the plurality of areas.

8. A prepress system according to claim 1, wherein the raster image processor develops the second print image data with a plurality of reference image positions for image development to create plural sets of the second raster image data, the plurality of reference image positions being separated by a distance smaller than a pixel pitch at the display resolution, and
   the plate image inspection processor calculates, for each of the plural sets of the second raster image data, an image difference magnitude that represents magnitude of difference from the first raster image data, and displays on the display device the plate image inspection result based on a selected one of the plural sets of the second raster image data having the smallest value of the image difference magnitude.

9. A method of executing plate image inspection using a prepress system, wherein
   the prepress system comprises:
   a raster image processor configured to develop first print image data to display resolution to create first raster image data, and to develop second print image data to the display resolution to create second raster image data;

a data storage;

a plate image inspection processor configured to execute a plate image inspection process by comparing the first and second raster image data, and to display on a display device a result of the plate image inspection process; and a controller configured to control the raster image processor, the data storage, and the plate image inspection processor, and wherein the controller includes a parameter setting section configured to set a flow pattern of a prepress process, the second print image data is proofed data of the first print image data, the method comprises the steps of:

at the parameter setting section, setting a first flow pattern of the prepress process for the first print image data and a second flow pattern of the prepress process for the second print image data, the first flow pattern including a step where the data storage stores the first raster image data obtained by the raster image processor, the second flow pattern including a step where the plate image inspection processor executes the plate image inspection process by comparing the first and second raster image data;

at the controller, upon receiving the first print image data, executing the prepress process according to the first flow pattern where the controller causes the data storage to store the first raster image data; and at the controller, upon receiving the second print image data, executing the prepress process according to the second flow pattern where the controller causes the plate image inspection processor to execute the plate image inspection process.

10. A method according to claim 9, wherein the print image data may include a text object, a graphics object, and a bitmap image object in respective formats.

11. A method according to claim 9, wherein the plate image inspection process includes calculating, for each pixel location, a pixel value difference between the first and second raster image data, and the result of the plate image inspection process distinctly displays pixels whose pixel value difference is greater than a threshold value, which can be adjusted by a user.

12. A method according to claim 9, wherein the first raster image data for use in the plate image inspection process is selected by a user.

13. A method according to claim 9, wherein if the print image data includes plural types of image objects, the developing is performed using at least one specific type but not all types of image objects.

14. A method according to claim 9, wherein the developing the second print image data includes re-developing the second print image data after a reference image position for image development being moved by a distance smaller than a pixel pitch at the display resolution.

15. A method according to claim 14, wherein the developing the second print image data includes dividing a print area represented by the second print image data into a plurality of divisional areas each having an individual reference image position for image development; and the executing the plate image inspection process includes determining independently the plate image inspection result for each of the plurality of areas.

16. A method according to claim 9, wherein the developing the second print image data includes developing the second print image data with a plurality of reference image positions for image development to create plural sets of the second raster image data, the plurality of reference image positions being separated by a distance smaller than a pixel pitch at the display resolution, and the executing the plate image inspection process includes calculating, for each of the plural sets of the second raster image data, an image difference magnitude that represents magnitude of difference from the first raster image data, and displaying on the display device the plate image inspection result based on a selected one of the plural sets of the second raster image data having the smallest value of the image difference magnitude.

17. A computer program product for executing plate image inspection using a prepress system, wherein the prepress system comprises:

a raster image processor configured to develop first print image data to display resolution to create first raster image data, and to develop second print image data to the display resolution to create second raster image data; a data storage; and a plate image inspection processor configured to execute a plate image inspection process by comparing the first and second raster image data, and to display on a display device a result of the plate image inspection process, and wherein the second print image data is proofed data of the first print image data, the computer program product comprises:

a computer readable storage medium; and a computer program for a prepress process stored on the computer readable storage medium, the computer program including:

a first program for setting a first flow pattern of the prepress process for the first print image data and a second flow pattern of the prepress process for the second print image data, the first flow pattern including a step where the data storage stores the first raster image data obtained by the raster image processor, the second flow pattern including a step where the plate image inspection processor executes the plate image inspection process by comparing the first and second raster image data: a second program, upon receiving the first print image data, for executing the prepress process according to the first flow pattern to cause the data storage to store the first raster image stat; and a third program, upon receiving the second print image data, for executing the prepress process according to the second flow pattern to cause the plate image inspection processor to execute the plate image inspection process.

18. A prepress system comprising:

a raster image processor configured to develop first print image data to display resolution to create first raster image data, and to develop second print image data to the display resolution to create second raster image data;

a data storage configured to store the first raster image data created in advance prior to creation of the second raster image data;

a plate image inspection processor configured to execute a plate image inspection process by comparing the first and second raster image data, and to display on a display device a result of the plate image inspection process; and a controller configured to control the raster image processor, the data storage, and the plate image inspection processor, wherein the controller includes a parameter setting section configured to set a flow pattern of a prepress process, the flow pattern including a storing-inspection step, the controller executes the prepress process according to the flow pattern, when processing the first print image data according to the flow pattern, the controller causes the data storage, in the storing-inspection step, to store the first raster image data obtained by the raster image processor for use in a future inspection process of proofed print image data without executing the inspection process, followed by executing a next step in the flow pattern, the first print image data being print image data prior to proofing, when processing the second print image data according to the flow pattern, the controller causes the plate image inspection processor, in the storing-inspection step, to execute the plate image inspection process, the second print image data being proofed data of the first print image data.

19. A method of executing plate image inspection using a prepress system, wherein the prepress system comprises:
a raster image processor configured to develop first print image data to display resolution to create first raster image data, and to develop second print image data to the display resolution to create second raster image data;
a data storage;
a plate image inspection processor configured to execute a plate image inspection process by comparing the first and second raster image data, and to display on a display device a result of the plate image inspection process; and
a controller configured to control the raster image processor, the data storage, and the plate image inspection processor, and wherein the method comprises the steps of:
at the controller, setting a flow pattern of a prepress process, the flow pattern including a storing-inspection step; and
at the controller, executing the prepress process according to the flow pattern, and wherein the executing the prepress process includes the steps of:
when processing the first print image data according to the flow pattern, at the controller, causing the data storage, in the storing-inspection step, to store the first raster image data obtained by the raster image processor for use in a future inspection process of proofed print image data without executing the inspection process, followed by proceeding to a next step in the flow pattern, the first print image data being print image data prior to proofing; and when processing the second print image data according to the flow pattern, at the controller, causing the plate image inspection processor, in the storing-inspection step, to execute the plate image inspection process, the second print image data being proofed data of the first print image data.

20. A computer program product for executing plate image inspection using a prepress system, wherein the prepress system comprises:
a raster image processor configured to develop first print image data to display resolution to create first raster image data, and to develop second print image data to the display resolution to create second raster image data; a data storage; and a plate image inspection processor configured to execute a plate image inspection process by comparing the first and second raster image data, and to display on a display device a result of the plate image inspection process, and wherein the computer program product comprises: a computer readable storage medium; and a computer program stored on the computer readable storage medium, the computer program including:
a first program for setting a flow pattern of a prepress process, the flow pattern including a storing-inspection step; and
a second program for executing the prepress process according to the flow pattern, and wherein the second program includes:
a program, when processing the first print image data according to the flow pattern, for causing the data storage, in the storing-inspection step, to store the first raster image data obtained by the raster image processor for use in a future inspection process of proofed print image data without executing the inspection process, followed by proceeding to a next step in the flow pattern, the first print image data being print image data prior to proofing; and
a program, when processing the second print image data according to the flow pattern for causing the plate image inspection processor, in the storing-inspection step, to execute the plate image inspection process, the second print image data being proofed data of the first print image data.

* * * * *